United States Patent [19]

Hammond et al.

[11] Patent Number: 4,621,761

[45] Date of Patent: Nov. 11, 1986

[54] PROCESS FOR FORMING UNUSUALLY STRONG JOINTS BETWEEN METALS AND CERAMICS BY BRAZING AT TEMPERATURES THAT DO NO EXCEED 750 DEGREE C.

[75] Inventors: Joseph P. Hammond; Stan A. David, both of Knoxville; John J. Woodhouse, Crossville, all of Tenn.

[73] Assignee: The United States of America as represented by the United States Department of Energy, Washington, D.C.

[21] Appl. No.: 677,955

[22] Filed: Dec. 4, 1984

[51] Int. Cl.[4] .............................................. B23K 31/02
[52] U.S. Cl. .................................... 228/124; 228/190; 228/206; 228/263.12; 228/263.16; 228/263.21
[58] Field of Search ............... 228/122, 124, 190, 205, 228/206, 238, 263.12, 263.14, 263.16, 263.21

[56] References Cited

U.S. PATENT DOCUMENTS

| | | | |
|---|---|---|---|
| 1,997,538 | 4/1935 | Armstrong | 228/206 X |
| 2,024,150 | 12/1935 | Davignon | 228/263.16 X |
| 3,063,144 | 11/1962 | Palmour | 228/124 |
| 3,432,913 | 3/1969 | Bronnes et al. | 228/263.12 X |
| 3,736,648 | 6/1973 | Spielberg et al. | 228/200 X |
| 4,433,230 | 2/1984 | Sano et al. | 228/263.21 |

Primary Examiner—Nicholas P. Godici
Assistant Examiner—Carmine Cuda
Attorney, Agent, or Firm—Katherine P. Lovingood; Stephen D. Hamel; Judson R. Hightower

[57] ABSTRACT

This invention is a process for joining metals to ceramics to form very strong bonds using low brazing temperature, i.e., less than 750° C., and particularly for joining nodular cast iron to partially stabilized zirconia. The process provides that the ceramic be coated with an active metal, such as titanium, that can form an intermetallic with a low melting point brazing alloy such as 60Ag-30Cu-10Sn. The nodular cast iron is coated with a noncarbon containing metal, such as copper, to prevent carbon in the nodular cast iron from dissolving in the brazing alloy. These coated surfaces can be brazed together with the brazing alloy between at less than 750° C. to form a very strong joint. An even stronger bond can be formed if a transition piece is used between the metal and ceramic. It is preferred for the transition piece to have a coefficient of thermal compatible with the coefficient of thermal expansion of the ceramic, such as titanium.

39 Claims, No Drawings

PROCESS FOR FORMING UNUSUALLY STRONG JOINTS BETWEEN METALS AND CERAMICS BY BRAZING AT TEMPERATURES THAT DO NO EXCEED 750 DEGREE C.

BACKGROUND OF THE INVENTION

The disclosed invention is a brazing process for forming very strong joints between metals and ceramics while limiting the brazing temperature to not more than 750° C., and is more particularly a process for bonding nodular cast iron to partially stabilized zirconia at brazing temperatures that do not exceed 750° C.

Machine parts using ceramics in conjunction with metals have recently been developed and have advantages in high-temperature applications, since ceramics withstand very high temperatures and possess lower thermal conductivity than metals. In adiabatic turbocompound engines, for example, ceramics will permit higher operating temperatures, reduced heat loss and higher exhaust energy recovery, resulting in higher thermal efficiency. Although an engine utilizing all ceramic parts would be desirable because of the high temperature characteristics of ceramic materials, significant developmental problems must be overcome before such an engine is a practical reality. Presently, development work is being directed to the incorporation of ceramics into engines to the greatest extent possible.

Ceramics are being used as seals in space power generators and have been proposed for use in heat exchangers, but a major area of interest, and of interest with regard to this invention, is the use of ceramics in combination with metals for diesel engine parts. Insulating metal parts with ceramics inhibits heat rejection to certain diesel engine components thus reducing external cooling requirements and raising overall in-cylinder and exhaust gas temperature. A major technical problem with the adiabatic diesel engine concept has been the difficulty of reliably joining insulation ceramics to critical engine components. Of those brazing processes known in the prior art, the active filler method and the moly manganese process provided joints having inferior strengths and required excessively high temperatures. A third prior art process, the active hydride powder process, resulted in a joint of inferior strength and also failed to give consistent results.

Metal construction materials to be used in adiabatic diesel engines have strict limitations on exposure to elevated temperatures, therefore there is a need for a process that gives reliably strong joints between these metals and ceramics at low brazing temperatures. For the adiabatic diesel engine, the leading candidate for the metal construction material is nodular cast iron (NCI), while the choice for the ceramic is partially stabilized zirconia (PSZ).

NCI has a structure composed of nodules of graphite in a matrix of either all ductile ferrite, ferrite plus pearlite, or all pearlite. The pearlite, composed of a mixture of lamellar ferrite and cementite, is the constituent primarily responsible for the strength of the cast iron. For adiabatic engine pistons, nodular cast irons with a yield strength of 55 to 80 ksi will be required, which corresponds to pearlite contents of about 80 to 100%.

NCI has a lower critical transformation temperature of 723° C. When cast iron is heated much above this temperature for times required for brazing (about 10 minutes), the braze joint may be damaged by a strain imparted by the transformation of the pearlite to austenite, and again further by reversible transformation strain during cool down. Another concern relative to excessive heating during brazing is the potential for weakening the nodular cast iron by spheroidization of the lamellar cementite phase of pearlite. A practical limitation on temperature when brazing piston quality NCI is thought to be about 750° C.

Partially stabilized zirconia (PSZ) refers to a zirconia ceramic material stabilized by addition of other selected elements, such as Mg, Y, or Ca which maintain the zirconia primarily in the cubic phase. Whereas pure zirconia transforms from the cubic to the tetragonal to the monoclinic crystal forms on slow cooling from the melt, PSZ is maintained in the cubic form but with up to 35% tetragonal phase. Heating the PSZ at temperatures above 850° C. could result in an alteration of the crystal phase structure and may cause a considerable decrease in toughness.

Therefore, there is a need to form strong, reliable joints between metals and ceramics without the requirement of extremely high brazing temperatures that could increase the likelihood of sacrificing desired physical properties of the individual components.

SUMMARY OF THE INVENTION

In view of the above-mentioned need, it is an object of this invention to provide a process for brazing metals to ceramics wherein the brazing temperature can be limited.

It is another object of this invention to provide a process for forming high-quality, high-strength braze joints between metals and ceramics.

A further object is to provide a process for making improved parts for use in high-temperature applications.

Still another object of the invention is to provide a process for making metal-ceramic parts to improve the efficiency of adiabatic diesel engines.

Another object is to provide an active substrate brazing process by applying an activating substance on the surface of the ceramic.

A further object of this invention is to provide a process for joining metals to ceramics that takes advantage of the formation of an intermetallic compound during brazing.

One other object is to provide a process for joining metals to ceramics at brazing temperatures that do not exceed 750° C.

Additional objects, advantages and novel features of the invention will be set forth in part in the description which follows and in part will become apparent to those skilled in the art upon examination of the following or may be learned by practice of the invention. The objects and advantages of the invention may be realized and attained by means of instrumentalities and combinations particularly pointed out in the appended claims.

To achieve the foregoing and other objects and in accordance with the purpose of the present invention, the process of the invention comprises cleaning the metal and ceramic surfaces to be brazed and, in a vacuum, coating the metal surface with a thin layer of noncarbon containing metal and coating the ceramic surface with a thin layer of an activating substance. While still in a vacuum, these coated surfaces and a suitable brazing alloy are positioned in a sandwich fashion with the brazing alloy disposed between the two coated surfaces. A suitable brazing alloy is one that melts at not more than 750° C. and can form an intermetallic with the activating substrate upon brazing. Thus positioned, the components are heated to the brazing temperature and held for a time sufficient to cause the brazing alloy to melt, flow and wet the respective surfaces. Upon cooling the desired joint is formed.

The preferred brazing alloy is a silver (Ag) - copper (Cu) eutectic alloy to which an amount of an element or elements are added that have the ability to lower the melting point. Such melting point depressants include tin (Sn), germanium (Ge), manganese (Mn), zinc (Zn), cadmium (Cd) and phosphorus (P). However, Zn, Cd and P have a tendency to volatilize and could cause problems under vacuum brazing conditions. Consideration is thus limited to the alloys Ag-Cu-Sn, Ag-Cu-Ge, Ag-Cu-Mn and Ag-Cu-Sn-Mn. In a particular embodiment of this invention 60Ag-30Cu-10Sn wt. % was used.

The metal, which is an iron-containing alloy that is stable at temperatures above 400° C. and below 1,000° C., is a stainless steel, a low alloy steel, a special purpose alloy steel or other like alloys; but for diesel engine use, the preferred metal is nodular cast iron. The surface of this metal is coated with a noncarbon-containing metal that can be wet by the brazing alloy while preventing graphite in the metal from dissolving in the brazing alloy. Suitable coatings include copper or iron with a successive coating of nickel.

The ceramic is alumina, silica whisker-reinforced alumina, zirconia partially stabilized by yttrium (Y), magnesium (Mg), or calcium (Ca) or other similar ceramics. In a preferred embodiment of the invention partially stabilized zirconia, with either Mg or Y as a stabilizing element, is used. The surface of the ceramic is coated with an activating substance such as Ti, Zr, tantalum (Ta) or niobium (Nb) or compounds of these metals. For this experiment Ti was used as the activating substance to coat the ceramic surface.

There are three proposed embodiments of this process, however, a person skilled in the art might very well envision more upon the study and practice of this invention. First, the coated surfaces of metal and ceramic are brazed, with the brazing filler metal alloy between, in a single step. Secondly, the surfaces are brazed with a transition piece between, with intervening filler metal, and this can be done in a single step. Finally, a transition piece is brazed to the ceramic first and subsequently the transition piece is brazed to the metal, both brazing processes being done with intervening filler metal. The preferred metal to be used as a transition piece is one that has a coefficient of expansion compatable with that of the ceramic, is compatible with the use environment, and is ductile and remains ductile on heating and cooling as required by the brazing procedure. In this invention, Ti metal was used as the transition piece.

Although other processes have been developed for situations where high-temperature brazing is suitable, such processes are not suitable for joining NCI to PSZ where low temperatures must be maintained to avoid damage to the physical properties of the components. The advantage of the process of this invention is that it consistently forms a strong bond between the metal and the ceramic using brazing temperatures which do not exceed 750° C. This strong bond is partly a result of an intermetallic formed at this low brazing temperature. In the prior art, processes were designed to avoid the formation of intermetallics because they can embrittle when their concentration and morphology are not appropriately controlled. However, according to the subject invention, brazing temperatures are kept low enough to avoid such embrittlement while allowing the formation of an intermetallic that enhances the strength of the joint.

DESCRIPTION OF THE PREFERRED EMBODIMENT

The invention is a process for forming very strong joints between metals and ceramics at brazing temperatures of not more than 750° C. The metals contemplated are iron-containing metals such as stainless steel, low alloy steel, special purpose alloy steel and similar alloys that are stable at temperatures up to 1,000° C. Nodular cast iron is of special interest for use in adiabatic diesel engines and is used in particular embodiments and examples of the subject invention. The ceramics, which should have low thermal conductivity and withstand high temperatures, include alumina, silica whisker-reinforced alumina, and partially stabilized zirconia. A preferred embodiment of this invention uses zirconia partially stabilized with either Mg or Y although zirconia stabilized with Ca would also be a suitable ceramic material.

The invention may be practiced in at least three forms. The first is a single stage process wherein the ceramic is brazed directly to the NCI in a single step brazing operation. The second is also a single step brazing operation wherein a transition piece is interposed between the ceramic and the NCI and the entire assembly is brazed. The third type of brazing operation involves a two-step process wherein a transition piece is brazed to the ceramic at a first brazing temperature compatible with the ceramic, and the transition piece is subsequently brazed to the NCI at a lower temperature in the second step.

The brazing alloy will determine the brazing temperature of the process. Therefore it is important to select an alloy that melts at a low temperature. One class of brazing alloys with generally low melting points is the silver-copper eutectic alloy group. For a preferred embodiment, tin, a melting point depressant, was added to a silver-copper alloy to yield the composition 60Ag-30Cu-10Sn having a melting point of 718° C. Other melting point depressants such as Ge and Mn could also be used, but upon practice of the invention it was discovered that Sn had the unexpected advantage of partitioning or dissolving in the Ti-Cu intermetallic and contributing to the strength of the bond.

Although this Ag-Cu-Sn alloy had a sufficiently low melting point for purposes of brazing, it was ineffective alone for forming a strong joint with the ceramic. Active metals such as Ti, Zr, Ta and Nb, and their compounds are often added to the brazing alloy to enhance wetting, flow, and bonding, Ti being the most common. However, when 10% Ti was added to the brazing alloy, the melting point increased to above 900° C., high above the highest temperature NCI can tolerate without serious damage to its physical properties. The solution to this problem was to coat the surface of the ceramic with a thin layer of Ti, forming an active substrate to which the Ag-Cu-Sn brazing alloy could bond. This new process gave very favorable results with resulting shear strengths of the joints considerably higher than the minimum strength required for applications in adiabatic diesel engines.

At first it was believed that Ti would form a binary intermetallic with the Cu of the brazing alloy. Other metallizing techniques using a thin coating of Ti on the ceramic have been designed to avoid the formation of Ti-containing intermetallics by successive layering of other metals over the Ti. This is done to avoid embrittlement that results from uncontrolled formation of intermetallics in the joint microstructure. Since this invention limits brazing temperatures to not more than 750° C. it was thought that controlled formation of an intermetallic could strengthen the bond without attendant high-temperature induced embrittlement. There was, in fact, an intermetallic of controlled thickness and morphology formed but it was unexpectedly a ternary intermetallic of Ti-Cu-Sn rather than the expected binary Ti-Cu.

The surface of the PSZ to be brazed is cleaned and covered with a thin coating of Ti. The method used for cleaning the PSZ is plasma ion etching. This is a convenient preparation because the argon plasma can then be used to sputter Ti from a target onto the PSZ by reversing polarity. An excellent alternative technique for forming the Ti coating is ion plating. The latter coating method deposits metal ions onto the ceramic surface at velocities sufficient to produce ion imbedment and mixing to several atomic layers in depth and thus improve adherence. Experiments have shown that the Ti of the sput coating adjacent to the ceramic surface oxidizes on heating to the brazing temperature. If the coating is very thin (0.1 μm), all of the Ti oxidizes to TiO and the substrate will not be wet by the brazing alloy. It was determined by experimentation that the Ti sput should be at least 0.3 μm thick.

With the thicker Ti sput active titanium metal makes contact with the braze filler metal alloy at the time the latter becomes molten, although titanium oxide still forms adjacent to the ceramic. The formation of the TiO layer is compatible with the process since it is very adherent and its coefficient of expansion is close to that of PSZ. With increasing time at the brazing temperature, solid Ti-Cu-Sn intermetallic is formed at the surface of the sput as Cu and Sn diffuse from the liquid filler metal. There is a low interfacial energy between the liquid filler metal alloy and the solid intermetallic that causes the braze alloy to wet and flow over the metallized ceramic surface, resulting in an especially strong joint with solidification of the filler metal. This is the first documented case where an intermetallic compound is purposely formed to promote wetting and adherence in ceramic-to-metal braze joining.

As for the NCI, it is cleaned by hot bath caustic etching to remove surface carbon and the surface to be brazed is subsequently electroplated with a layer of copper 1 to 2 mils thick. Covering the NCI with copper prevents the graphite within the NCI from dissolving in the brazing alloy which would prevent wetting of NCI by the brazing alloy. To achieve equivalent results, NCI can also be sputter coated with a 2 μm thick first layer of iron followed by nickel layer that is about 0.1 μm thick.

Although a strong bond can be formed between the coated metal and treated ceramic with only a brazing filler metal alloy between, a preferred embodiment adds a transition piece between the metal and ceramic with brazing alloy between the metal and the transition piece and also between the ceramic and the transition piece. The transition piece should be ductile and remain ductile after necessary heating and cooling, it should have a coefficient of thermal expansion compatible with the ceramic since the ceramic does not deform, and it should be compatible with the use environment.

For a preferred embodiment of this invention the transition piece is titanium. The joint can be formed in a single brazing step or the transition piece can be brazed to a first surface and subsequently brazed to a second surface thus affording the flexibility of brazing the transition piece to the metal and the ceramic at different brazing temperatures if desired. When using the transition piece, the preferred thickness of the titanium substrate was found to be about 0.3–0.6 μm.

Strong joints have been formed using this process brazing at 723° C., 735° C. and 750° C. for about ten minutes. The heating and cooling process isn't critical provided it is not done in a manner that would cause formation of austenite in NCI.

The invention is further described in the following examples.

EXAMPLE I

A one-inch diameter PSZ wafer was brazed to an NCI base of equivalent diameter using the subject process.

In a vacuum, the PSZ ceramic substrate surface was cleaned by plasma ion etching for thirty (30) minutes at a 2 kv setting. The cleaned ceramic was then sputter coated with 1 to 2 μm of titanium metal to form the "active substrate" for brazing.

The NCI was given a hot-bath caustic etching to remove surface carbon and electroplated with copper to a thickness of 0.050 mm. This treatment was to prevent the graphite in the NCI from dissolving in the braze filler metal and preventing wetting of the NCI surface by the braze alloy.

The Ti-coated ceramic was assembled with the copper-coated NCI base separated by a 0.003-inch thick foil of braze filler metal alloy having the composition 60Ag-30Cu-10Sn. The assembly was placed in vacuum ($5 \times 10^{-5}$ torr) where it was rapidly heated to 735° C. and held for ten (10) minutes while brazing occurred. Just prior to cooling, the brazing furnace was back-filled with argon to discourage microvoid formation and to speed up cooling. Successful joints were brazed in a single step brazing operation. The overall appearance of the brazed joints was excellent.

Simultaneous with the above-described operation, several miniature pad/bar shear specimens and pad/pad sandwich specimens of the same PSZ/NCI materials were brazed using equivalent procedures. Results of shear strength tests are shown in Table I.

TABLE I

Braze interface shear strengths[a] of the PSZ/NCI joint without transition piece

| Cap | | Base | | Filler | Shear strength[c] | |
|---|---|---|---|---|---|---|
| Material | Treatment[g] | Material | Treatment | metal[b] | MPa | (ksi) |
| PSZ | 1 μm Ti | NCI | 0.025 mm Cu | [e] | 120 | 17.4 |
| PSZ | 1 μm Ti | NCI | 1 m Fe[d] | [e] | 49 | 7.1 |

TABLE I-continued

Braze interface shear strengths[a] of the PSZ/NCI joint without transition piece

| Cap | | Base | | Filler | Shear strength[c] | |
|---|---|---|---|---|---|---|
| Material | Treatment[g] | Material | Treatment | metal[b] | MPa | (ksi) |
| PSZ | 2 μm Ti | NCI | 0.050 mm Cu | e | 54 | 7.9 |
| PSZ | 2 μm Ti | NCI | 0.050 mm Cu | f | 63 | 9.2 |

[a]Established on miniature pad/bar specimens braze fired 10 minutes at 750° C. in vacuum (5 × 10$^{-5}$ torr).
[b]60Ag—30Cu—10Sn (wt. %) as foil.
[c]Average of 2.
[d]Plus 1/10 μm Ni sput.
[e]Bare.
[f]Plus ½ μm Ti sput on side adjacent to NCI.
[g]1 μm = 10,000Å

When comparing these results with those in Table II it is clear that including a transition piece in the joint considerably improves the shear strength (from 17.4 to 27.1 ksi).

EXAMPLE II

One-inch diameter PSZ wafers were brazed to NCI bases by the same general procedure described in Example I except that a transition piece was placed between the ceramic and NCI. The coefficient of thermal expansion (CTE) for PSZ is about $10 \times 10^{-6}$/°C., and the CTE for NCI is about $12.5 \times 10^{-6}$/°C. By placing a 0.028-inch thick transition piece (TP) selected from a metal such as Ti, the CTE of the metal member adjoining the ceramic is reduced to a value near that of the PSZ. The CTE of titanium metal is about $10.2 \times 10^{-6}$/°C.

Simultaneous with the above procedure, miniature pad/TP/pad sandwich and pad/TP/bar shear specimens of the same PSZ/Ti/NCI materials were brazed using identical procedures as described above. Results of shear strength tests are shown in Table II. The shear tests were performed at room temperature. Note that the 0.1 μm thick Ti sputter coat failed to permit wetting of the ceramic surface because oxygen from the ceramic completely reacted with the Ti sput to form TiO, which is nonwetting to the metal brazing alloy. Coatings 0.3 μm to about 1 μm thick gave good shear strength which began to decline at thicknesses greater than about 1.0 μm.

Brazing PSZ to the Ti transition piece at 800° C. when using a Ti sput of 1.0 μm thickness, on the other hand, gave a braze interface shear strength of only 5.2 ksi. This inferior strength for the higher temperature braze was shown to result from a lack of control over the thickness of the intermetallic formed on the Ti sput during brazing.

When brazing at 750° C., two exothermic reactions occur that promote bonding, thus the term active substrate brazing. First, the PSZ substrate reacts with underside of the titanium metal sput coating to form a suboxide of titania (TiO). Subsequently, the filler metal on liquifying reacts with titanium metal on the topside to form a titanium-copper-tin intermetallic compound ($Ti_xCu_ySn_z$) of controlled thickness and morphology. The former reaction is instrumental in promoting adhesion to the ceramic surface. The latter reaction, by producing solid intermetallic/liquid phase interface of exceedingly low energy, gives acute-angle wetting. Spreading of the liquid filler metal over the ceramic surface is enhanced by the formation of the intermetallic compound,

TABLE II

Braze interface shear strengths[a] of the PSZ/NCI joint with titanium transition piece

| Cap/base | | Braze[b] temperature | Shear strength[c] | |
|---|---|---|---|---|
| Material | Treatment[d] | (°C.) | MPa | (ksi) |
| PSZ | 1/10 μm Ti | 750 | 0 | 0 |
| PSZ | 3/10 μm Ti | 750 | 235 | 34.1 |
| PSZ | 3/5 μm Ti | 750 | 197 | 28.5 |
| PSZ | 1 μm Ti | 750 | 187 | 27.1 |
| PSZ | 2 μm Ti | 750 | 74 | 10.7 |
| PSZ | 1 μm Ti | 800 | 36 | 5.2 |
| NCI | 0.025 mm Cu | 750 | 117 | 16.9 |
| NCI | 0.050 mm Cu | 750 | 234 | 34.0 |

[a]Established on miniature pad/bar specimens using 60AG—30Cu—10Sn (wt. %) foil filler material.
[b]Fired 10 minutes at temperature in vacuum (5 × 10$^{-5}$ torr).
[c]Average of 2.
[d]1μm = 10,000Å

EXAMPLE III

In another example, PSZ could be brazed to NCI with an interposed Ti transition piece in a two-step process using filler metal with the Ti activation agent incorporated in it. This has the advantage of not having to vapor coat the ceramic in advance of brazing. After chemically cleaning the PSZ, it would be vacuum brazed to the Ti transition piece at a temperature above 750° C. employing a Ti-bearing Ag-Cu brazing alloy. For example, for a braze alloy of 60Ag-30Cu-10Ti (wt. %), a brazing temperature of 1,000° C. could also be used. Subsequently, the Ti-clad PSZ would be vacuum brazed to the copper coated NCI at 750° C. or lower by the braze cycle employed in Example II. This example demonstrates that the PSZ can be first brazed at a temperature compatible with the ceramic and TP while the TP can be subsequently joined to NCI at a lower temperature which is compatible with NCI requirements.

In general, joints prepared by above procedures of Examples I and II were of excellent quality. However, shear tests performed on the miniature pad/bar specimens showed the joints incorporating the transition piece to be stronger than those made directly between ceramic and NCI. Shear strengths of the braze joints on an average exceeded 234 MPa (34 ksi) at the PSZ/TP and TP/NCI interfaces, whereas only 120 MPa (17.4 ksi) was obtained for the directly joined PSZ/NCI interface. It was also concluded that the single operation (Example II) braze cycle, as opposed to the less cost-effective two-stage brazing process (Example III), is preferred and should be used for the PSZ/TP/NCI piston cap fabrication. It has been shown that the TP-containing joint can be fabricated in a single brazing cycle and that its interfaces are stronger than that for the joints fabricated without the TP.

The use of Ti as an active substrate on the surface of the ceramic allows the formation of the intermetallic Ti-Cu-Sn when brazed with the Ag-Cu-Sn brazing alloy, which further facilitates wetting and spreading of the brazing alloy on the ceramic surface, thus yielding an improved joint of greater strength than previous joints. Additionally, the use of the selected brazing alloy also avoids the need for high brazing temperatures that could do damage to the physical properties of the NCI and possibly weaken the PSZ. The preferred joint is one containing a transition piece that can respond compatibly with both the ceramic and the metal on heating and cooling, minimizing stress induced by expansion and contraction.

We claim:

1. A process for brazing high melting point iron-containing metals to ceramics at temperatures not greater than 750° C. comprising, in a vacuum:
   (a) cleaning a surface to be brazed of a ceramic to remove surface oxygen therefrom;
   (b) coating said cleaned surface of ceramic with a thin layer of an active substrate that is from 0.3 to 1 micron thick;
   (c) cleaning a surface to be brazed of a high-melting point iron-containing metal to remove any surface carbon therefrom;
   (d) coating said surface to be brazed of said metal with a thin noncarbon containing metal coating to prevent any carbon contained in said metal from reacting with a brazing alloy;
   (e) forming an assembly of said ceramic surface and said metal surface in sandwich fashion with a brazing alloy placed therebetween, said brazing alloy having a melting point of less than 750° C., wetting said metal surface and forming a trimetal intermetallic with said active substrate upon brazing;
   (f) heating said assembly to the melting point of said brazing alloy for a period suitable to permit flow and wetting by said brazing alloy; and
   (g) cooling said assembly to form a brazed joint between said ceramic surface and said metal surface.

2. The process of claim 1 wherein said brazing alloy is a silver-copper eutectic alloy to which has been added a sufficient amount of a melting point depressant selected from the group consisting of Sn, Ge, Mn and combinations thereof to lower the melting point of said brazing alloy to not more than 750° C.

3. The process of claim 2 wherein said brazing alloy is an Ag-Cu-Sn composition.

4. The process of claim 3 wherein said ceramic is selected from the group of silica whisker-reinforced alumina, alumina or partially stabilized zirconia.

5. The process of claim 3 wherein said active substrate is selected from the group consisting of Ti, Zr, Ta and Nb and their compounds.

6. The process of claim 5 wherein said active substrate is Ti.

7. The process of claim 6 wherein said ceramic is partially stabilized zirconia.

8. The process of claim 6 wherein the composition of said brazing alloy is 60Ag-30Cu-10Sn by weight.

9. The process of claim 3 wherein said noncarbon containing metal coating comprises a layer of iron with a subsequent layer of nickel or a layer of copper.

10. The process of claim 9 wherein said high melting point iron-containing metal comprises low alloy steel, stainless steel, special purpose steel or nodular cast iron.

11. The process of claim 10 wherein said noncarbon containing metal coating is copper having a thickness in the range of 1 to 2 mils.

12. The process of claim 11 wherein said high melting point iron-containing metal is nodular cast iron having a composition of not less than 80% pearlite.

13. The process of claim 12 wherein said ceramic is partially stabilized zirconia.

14. The process of claim 13 wherein the composition of said brazing alloy is 60Ag-30Cu-10Sn by weight.

15. the process of claim 14 wherein said active substrate is Ti.

16. A process for brazing high melting point iron-containing metals to ceramics at a temperature not greater than 750° C. comprising, in a vacuum:
   (a) cleaning a surface to be brazed of a ceramic to remove surface oxygen therefrom;
   (b) coating said cleaned surface of said ceramic with a thin layer of an active substrate that is from 0.3 to 1 micron thick;
   (c) cleaning a surface to be brazed of a high melting point iron-containing metal to remove any surface carbon therefrom;
   (d) coating said surface to be brazed of said metal with a thin noncarbon containing metal coating to prevent any carbon contained in said metal from reacting with a brazing alloy;
   (e) forming an assembly of said ceramic surface and said metal surface in sandwich fashion with a transition piece placed therebetween, a first brazing alloy between said ceramic surface and said transition piece, and a second brazing alloy between said metal surface and said transistion piece; said first brazing alloy having a melting point of less than 750° C, forming a trimetal intermetallic with said active substrate upon brazing, and being capable of wetting said transition piece upon brazing; said second brazing alloy having a melting point of less than 750° C., being capable of wetting said metal surface and transition piece upon brazing;
   (f) heating said assembly to the melting point of the brazing alloy having the higher melting point for a period suitable to permit flow and wetting by said brazing alloys; and
   (g) cooling said assembly to form a brazed joint between said ceramic surface, said transition piece and said metal surface.

17. The process of claim 16 wherein said transition piece is a metal that is ductile and remains ductile upon heating to brazing temperature and subsequent cooling and, has a coefficient of expansion compatible with said ceramic.

18. The process of claim 17 wherein said transition piece is titanium.

19. The process of claim 18 wherein the composition of said first brazing alloy is 60Ag-30Cu-10Sn by weight.

20. The process of claim 19 wherein the composition of said second brazing alloy is 60Ag-30Cu-10Sn by weight.

21. The process of claim 20 wherein said ceramic is partially stabilized zirconia.

22. The process of claim 21 wherein said active substrate is Ti.

23. The process of claim 22 wherein said high melting point iron-containing metal comprises low alloy steel, stainless steel, special purpose steel or nodular cast iron.

24. The process of claim 23 wherein said noncarbon containing metal coating is copper having a thickness in the range of 1 to 2 mils.

25. The process of claim 24 wherein said high melting point iron-containing metal is nodular cast iron having a composition of not less than 80% pearlite.

26. A process for brazing high melting point iron-coating metals to ceramics at a temperature not greater than 750° C. comprising, in a vacuum;
 (a) cleaning a surface to be brazed of a ceramic to remove surface oxygen therefrom;
 (b) coating said cleaned surface of said ceramic with a thin layer of an active substrate that is from 0.3 to 1 micron thick;
 (c) forming an assembly of said ceramic surface and a first surface of a transition piece that is ductile and has a coefficient of expansion compatible with said ceramic in sandwich fashion with a first brazing alloy therebetween, said first brazing alloy having a melting point of less than 750° C., forming a tri-metal intermetallic with said active substrate, and capable of wetting said transition piece upon brazing;
 (d) heating said assembly to the melting point of said first brazing alloy for a period suitable to permit flow and wetting by said first brazing alloy;
 (e) cooling said assembly to form a brazed joint between said ceramic surface and said transition piece;
 (f) cleaning a surface to be brazed of a high melting point iron-containing metal to remove any surface carbon therefrom;
 (g) coating said surface to be brazed of said metal with a thin noncarbon containing metal coating to prevent any carbon contained in said metal from reacting with a brazing alloy;
 (h) forming an assembly of said metal surface and a second surface of said transition piece in sandwich fashion with a second brazing alloy placed therebetween, said second brazing alloy having a melting point the same as or less than said frist brazing alloy and being capable of wetting said metal surface and said second surface of said transition piece upon brazing;
 (i) heating said assembly to the melting point of said second brazing alloy for a period suitable to permit flow and wetting by said second brazing alloy; and
 (j) cooling said assembly to form a brazed joint between said metal surface and said transition piece.

27. The process of claim 26 wherein said transition piece is a metal that is ductile and remains ductile upon heating to brazing temperature and subsequent cooling and has a coefficient of expansion compatible with said ceramic.

28. The process of claim 27 wherein said transition piece is titanium.

29. The process of claim 28 wherein the composition of said first brazing alloy is 60Ag-30Cu-10Sn by weight.

30. The process of claim 29 wherein the composition of said second brazing alloy is 60Ag-30Cu-10Sn by weight.

31. The process of claim 30 wherein said ceramic is partially stabilized zirconia.

32. The process of claim 31 wherein said active substrate is Ti.

33. The process of claim 32 wherein said high melting point iron-containing metal comprises low alloy steel, stainless steel, special purpose steel or nodular cast iron.

34. The process of claim 33 wherein said noncarbon containing metal coating is copper having a thickness in the range of 1 to 2 mils.

35. The process of claim 34 wherein said high melting point iron-containing metal is nodular cast iron having a composition of not less than 80% pearlite.

36. The process of claim 6 wherein said titanium is applied by physical vapor deposition.

37. The process of claim 15 wherein said titanium is applied by physical vapor deposition.

38. The process of claim 22 wherein said titanium is applied by physical vapor deposition.

39. The process of claim 32 wherein said titanium is applied by physical vapor deposition.

* * * * *